Dec. 10, 1968
R. I. OLLEN
3,415,473
PIPE HANGER
Filed Dec. 23, 1966
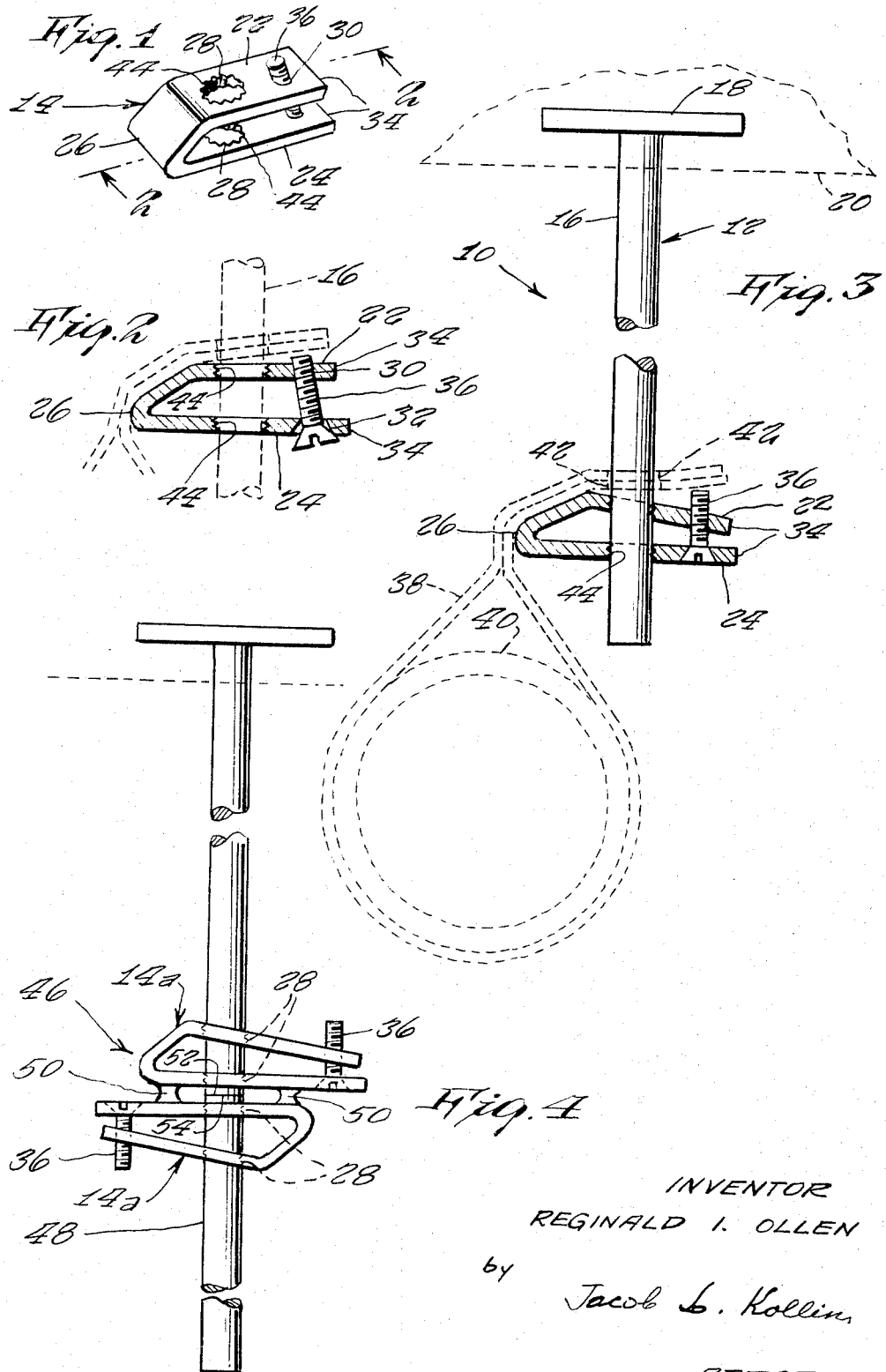
INVENTOR
REGINALD I. OLLEN
by Jacob L. Kollin
ATTORNEY United States Patent Office 3,415,473
Patented Dec. 10, 1968

3,415,473
PIPE HANGER
Reginald I. Ollen, 160—05 23rd Ave.,
Whitestone, N.Y. 11357
Filed Dec. 23, 1966, Ser. No. 604,259
2 Claims. (Cl. 248—59)

ABSTRACT OF THE DISCLOSURE

A pipe hanger including a post and a U-shaped retaining clamp having parallel legs and a circular toothed opening through each leg, the clamp being slidable on the post. The free leg ends of the clamp are tightened after the clamp and a pipe supporting strap mounted above it are set at a desired position on the post. The gripping action of the clamp's teeth secures the clamp to the post.

---

This invention relates generally to pipe hangers, for supporting pipe in a horizontally suspended position.

It is generally well known to those skilled in the art that conventionally used pipe hangers are provided with screw thread means for adjusting the elevation of the pipe relative to the pipe hanger during installation. This method of adjustment is time consuming and accordingly contributes to the installation costs.

This is of course undesirable and in want of improvement.

Accordingly, it is an object of the present invention to provide an improved pipe hanger that incorporates pipe supporting elements that are freely slidable vertically on an unthreaded post, and wherein the elements are frictionally securable to the post in a selected position.

Yet another object is to provide an improved pipe hanger having novel means for securing an extension to a post for purpose of supporting a pipe from the extension, the novel means comprising a pair of the above described elements secured together and wherein one of the elements is secured to the post and the other to the extension to secure them together.

Other objects are to provide an improved pipe hanger which is simple in design, inexpensive to manufacture, rugged in construction, easy to use and efficient in operation.

These and other objects will be readily evident upon a study of the following specification and the accompanying drawing wherein:

FIG. 1 is a perspective view of a sliding element which comprises a part of the present invention.

FIG. 2 is a cross sectional view thereof taken on line 2—2 of FIGURE 1.

FIG. 3 is a view similar to FIGURE 2 showing the device secured on a hanger post that comprises another part of the present invention, and FIG. 4 is a side elevation view of auxilliary parts of the invention used to extend a post, shown in operative use.

Referring now to the drawing in detail, and to FIGURES 1 to 3 particularly, the reference numeral 10 represents an improved pipe hanger according to the present invention, wherein there is a post member 12 and a retaining clamp member 14 that is adjustably securable along any part of the post.

The post comprises an elongated shank 16 which is circular in cross section and having a relatively smooth surface. An enlarged head 18 at one end is for the purpose of securing the post to an overhead ceiling 20 by imbedding the head therein.

The retaining clamp 14 comprises a sheet metal member of generally U-shaped configuration, having generally paralled legs 22 and 24 and a bent portion 26 adjacent one end of the legs. A circular, toothed opening 28 is provided through each leg, the openings being perpendicular through the legs and in alignment with each other. A threaded opening 30 in one leg and a countersunk opening 32 in the other leg are also provided, the openings 30 and 32 being in axial alignment and an inclined angle respective to the legs. The openings 30 and 32 located closed than the openings 28 to the terminal ends 34 of the legs. A screw 36 is secured to the clamp through openings 30 and 32.

In operative use, a strap 38 is fitted around pipe 40, the strap having openings 42 near its opposite ends, which are slipped over the lower end of post 12. The clamp 14 is then fitted therebelow over the lower end of the post, as shown in FIGURE 2. The screw 36 is then tightened, the legs being bent toward each other until the teeth 44 in openings 28 grip the surface of the post, thus securing the pipe at a desired elevation.

The present invention includes auxiliary members for the purpose of providing greater vertically downward length to the post. These members comprise a double clamp 46 and a post extension 48.

The clamp 46 is composed of a pair of clamp elements 14a, each of which is of the type as above described clamp 14 and which are enjoined back to back and in spaced apart relation by a pair of welds 50. It is to be noted that the screws 36 must be made accessible when the parts are assembled, and all openings 28 being in axial alignment.

In operative use, the post extension is placed with one end 52 in alignment with the lower end 54 of the post. The extension comprises a simple straight rod of same diameter as the post. One of clamp elements is secured, as above described, to the post, and the other to the extension as shown in FIGURE 4, thus allowing the pipe 40 to be supported from the extension.

While various changes may be made in the detail construction, it is understood that such changes will be within the spirit and scope of the present invention as is defined by the appended claims.

The combination as set forth in claim 1 wherein said extension support means comprises a straight extension rod of same diameter as said post and having at least one straight end for alignment therewith, and a double clamp comprised of a pair of said retaining clamps secured together, back to back in spaced apart relation by welds therebetween all, of said toothed openings of both said retaning clamps being in axial alignment.

1. In an improved pipe hanger, the combination of a post, a retaining clamp adjustably secured on said post, and extension support means on the lower end of said post, said post comprising an elongated shank of circular cross section, an enlarged head at the upper end of said shank, a straight cut end on said shank, said shank having a smooth surface throughout its length, said retaining clamp comprising a U-shaped sheet metal member having parallel legs and a bend at one end of said legs, a circular toothed opening through each leg, said openings being perpendicular to said legs and in alignment with each other, a threaded opening through one leg and a countersunk opening through the other leg, the latter said legs being in axial alignment with each other and at an angle respective to said legs, and a screw through said latter said legs and secured therein.

2. The combination as set forth in claim 1 wherein said extension support means comprises a straight extension rod of same diameter as said post and having at least one straight end for alignment therewith, and a double clamp comprised of pair of said retaining clamps secured together, back to back in spaced apart relation by welds therebetween and all, of said toothed openings of both said retaining clamps being in axial alignment.

References Cited

UNITED STATES PATENTS

| | | | |
|---|---|---|---|
| 1,231,544 | 6/1947 | Brown | 211—117 XR |
| 1,605,996 | 11/1926 | Stewart | 248—59 |
| 3,199,818 | 8/1965 | Ahara | 248—410 XR |
| 3,322,381 | 5/1967 | Bubb | 248—121 |

FOREIGN PATENTS 228,032 1/1960 Australia.

JOHN PETO, *Primary Examiner.*

U.S. Cl. X.R.

211—117; 248—327